C. WINKLER.
MACHINE FOR TRIMMING STEREOTYPE PLATES.
APPLICATION FILED OCT. 24, 1916.

1,313,775.

Patented Aug. 19, 1919.
2 SHEETS—SHEET 1.

INVENTOR
Carl Winkler
BY
ATTORNEYS

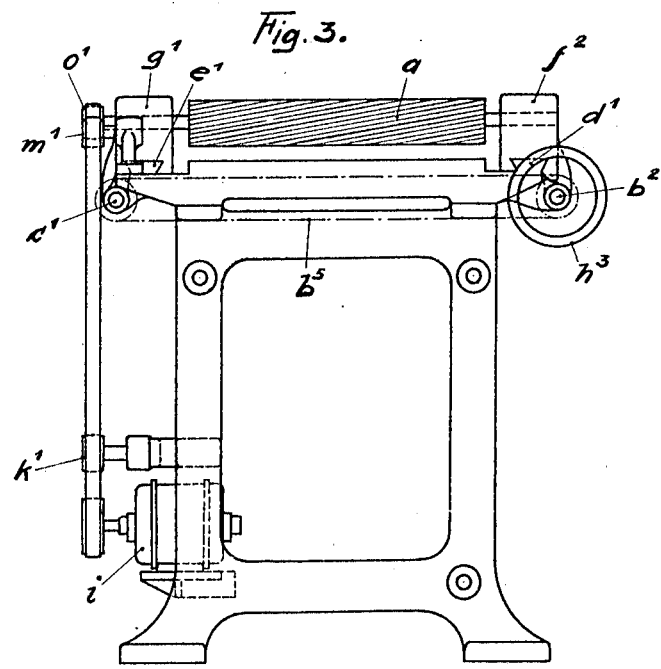
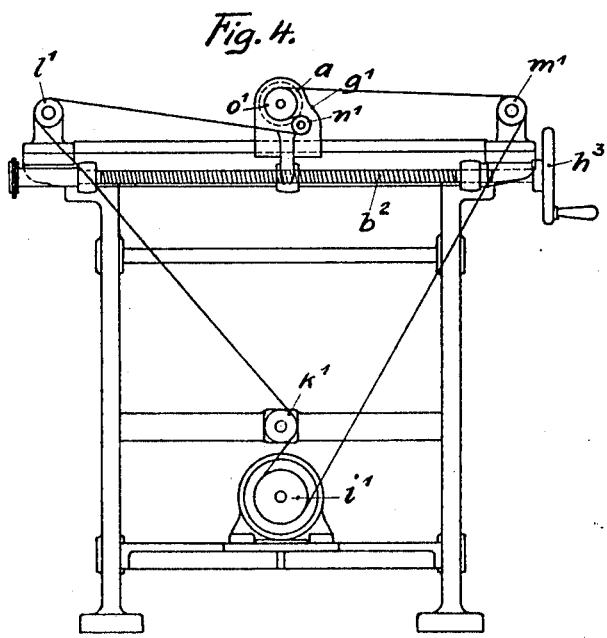

UNITED STATES PATENT OFFICE.

CARL WINKLER, OF BERNE, SWITZERLAND.

MACHINE FOR TRIMMING STEREOTYPE-PLATES.

1,313,775. Specification of Letters Patent. Patented Aug. 19, 1919.

Application filed October 24, 1916. Serial No. 127,400.

*To all whom it may concern:*

Be it known that I, CARL WINKLER, a citizen of the Swiss Republic, residing at Berne, in the Swiss Republic, have invented a new and useful Improved Machine for Trimming Stereotype-Plates, of which the following is a specification.

My present invention relates to an improved machine for trimming stereotype-plates, the improvement consisting in adapting the machine to trim the entire surface of a plate in one single operation by a rotary cylindrical cutter. This cutter has a length equal to the breadth of the plate and it is adjustably arranged over the table carrying said plate, and either the cutter or the table is adapted to move in the direction of the length or breadth of the plate.

In carrying out the invention it has been found to be of great advantage to give the cutter not only the usual rotary motion, but also a reciprocating movement in the direction of its axis.

By my invention I not only succeed in effecting an economy of time, which is of so extreme importance in stereotypy, but I am enabled to obtain a much better result than is possible with the planing machines heretofore used for the purpose.

Figure 1:
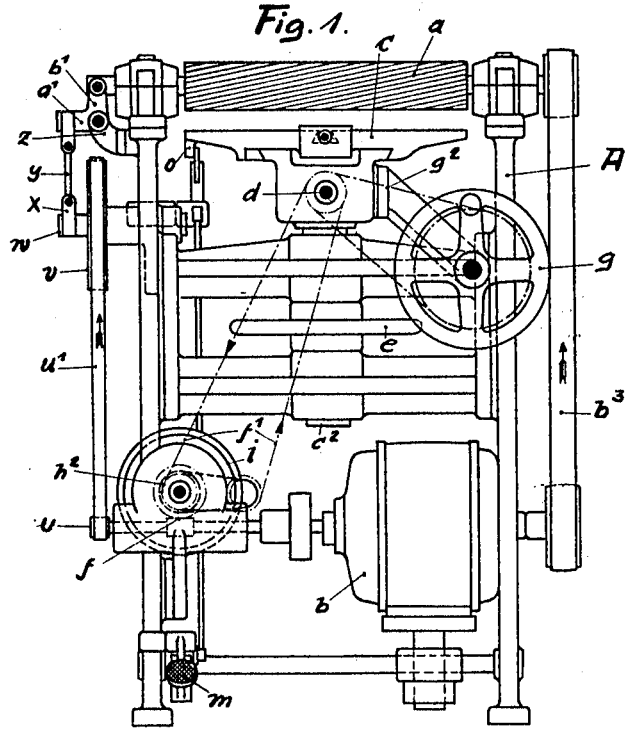
Figure 2:
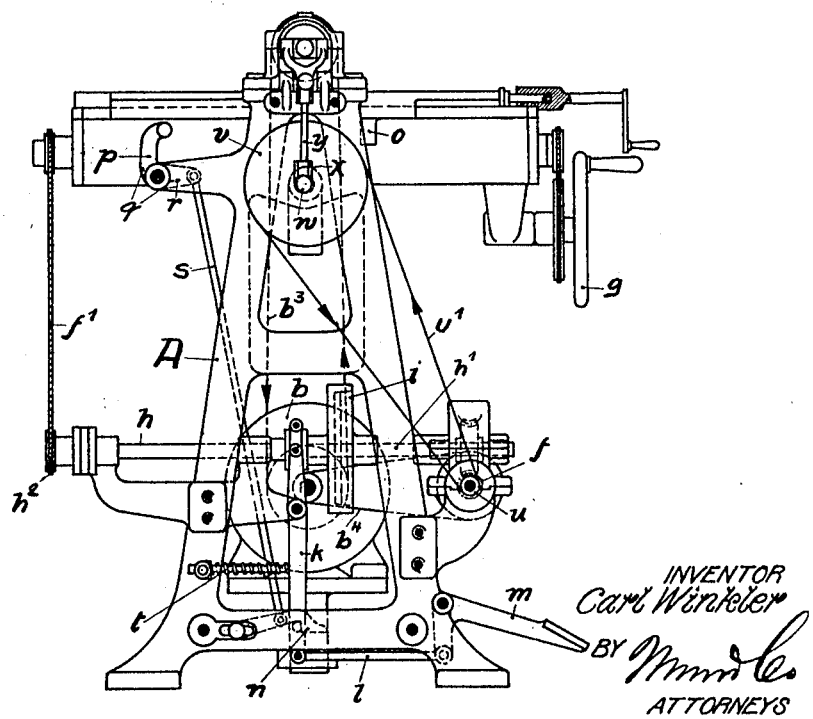

In the accompanying drawing two constructions of my new machine are shown by way of example, Figures 1 and 2 being elevations at right angles to each other of one construction, in which the work table is adapted to be moved in regard to the cutter, and Figs. 3 and 4 similar views of the other construction, in which the work table is stationary and the cutter is moved relative thereto.

Referring to Figs. 1 and 2 the rotary cylindrical cutter $a$ is journaled in the frame A of the machine, and it is driven by the motor $b$ through the agency of the belt $b^3$. $c$ is the work table, which is carried by a screw spindle $c^2$ and is designed to be raised and lowered by turning a hand wheel $e$ on said spindle, so that plates of various thicknesses can be trimmed. The movement of the work table $c$ relative to the cutter $a$ is effected by means of the worm gear $f$, endless chain $f'$ and screw spindle $d$. The worm gear $f$ is driven by the motor $b$ by the belt $b^4$, and between the shaft $h'$ carrying the worm wheel and the shaft $h$ carrying the chain wheel $h^2$, over which the endless chain $f'$ passes, there is a friction coupling $i$. By this mechanism the work table is caused to be moved slowly underneath the cutter $a$. The return movement of the work table is adapted to be effected by the hand wheel $g$ through the agency of the endless chain $g^2$, which passes over a chain wheel on the axis of the hand wheel $g$ and over a second chain wheel on the screw spindle $d$.

The friction coupling $i$ is connected by the lever $k$ and rod $l$ with the pedal $m$. If the coupling is closed the lever $k$ is retained in position by a pawl $n$. As soon as the cutter has passed over the back of the plate the tappet $o$ provided on the work table $c$ strikes against the arm $p$ of the bell crank lever $q$ mounted on an arm of the frame A, so that this lever is turned about its fulcrum, and, by means of the arm $r$, and the rod $s$ attached thereto, the pawl $n$ is raised out of connection with the lever $k$. Under the influence of the spring $t$ the lever $k$ is then turned and the parts of the coupling $i$ are moved away from each other.

On the shaft carrying the worm of the worm gearing $f$ is fastened the pulley $u$ which drives, through the agency of the belt $u'$, the pulley $v$, on which is eccentrically mounted a pin $w$, which by means of the link $x$ and rod $y$ reciprocates the bell crank lever $a'$ which is journaled in the arm $z$ of the frame A and is connected by its fork-shaped arm $b'$ with the axis of the cutter $a$, so that this cutter is moved longitudinally backward and forward. This longitudinal movement of the cutter in addition to its rotary movement is of great importance, because it has been found that when the cutter has a rotary movement alone it produces a rough surface on the back of the plate, while the combined rotary and longitudinal movement produces an absolutely smooth surface.

The construction shown in Figs. 3 and 4 differs from that shown in Figs. 1 and 2 by the fact that the work table is rigid and the cutter is adapted to be moved over said table. In this case the shaft carrying the cylindrical cutter $a$ is journaled in bearings $f^2$ and $g'$ which are adapted to be moved along undercut guides by the screw spindles $b^2$, $c'$. By means of the hand wheel $h^3$ the spindle $b^2$ can be turned, and the rotation of this spindle is transferred by the endless chain $b^5$ to the spindle $c'$. The cutter $a$ is rotated by a belt. $i'$ is the motor, $k'$, $l'$ and $m'$ are guide rolls having a fixed bearing, while the guide roll $n'$ mounted on the bearing $g'$ is naturally moved with this bearing. $o'$ is the pulley fastened to the shaft of the cutter $a$.

Instead of the hand wheel $h^3$ a pulley may be used which is driven by the motor $i'$ in exactly the same way as the screw spindle $d$ is driven by belt $f'$ in the construction shown in Figs. 1 and 2.

What I claim and desire to secure by Letters Patent of the United States is:—

1. A milling machine for trimming stereotype plates, comprising a work table to support the plate to be treated, an elongated cylindrical rotary milling tool adapted to operate with its entire length simultaneously, means for rotating the tool, and means for quickly moving the tool longitudinally backward and forward, substantially as and for the purpose set forth.

2. A milling machine for trimming stereotype plates, comprising a table, an elongated cylindrical milling tool mounted above the table, the table and tool having traveling movement relatively one to the other, means for rotating the tool, a rocking arm connected with the spindle of the tool, and means for rapidly rocking said arm to impart a rapid reciprocating movement to the tool.

3. In a machine for trimming stereotype plates, a table, a rotary and reciprocating cylindrical cutter mounted above the table, means for rotating the cutter, a bell crank having one member connected with the spindle of the cutter, a counter shaft having a crank arm, and connecting the crank arm with the other members of the bell crank, and means for operating the counter shaft from the cutter rotating means.

4. In a machine for trimming stereotype plates, a cutter, means for operating the cutter, a table below the cutter, a screw spindle mounted in the table, having a chain wheel thereon, a worm gear, means for operating the gear, a shaft driven from the worm gear and having a chain wheel thereon, and an endless chain passing around the chain wheels of the said shaft and screw spindle.

5. In a machine for trimming stereotype plates, a cutter, means for operating the cutter, a table below the cutter, a screw spindle mounted in the table and having a chain wheel thereon, a shaft having a chain wheel thereon, an endless chain passing around the chain wheels of the said shaft and screw spindle, a second shaft, means for operating the said second shaft, a coupling between the said shafts, and means for operating the coupling from the table.

6. In a machine for trimming stereotype plates, a cutter, means for operating the cutter, a table below the cutter, a screw spindle mounted in the table, a shaft, means for operating the screw spindle from the shaft, a second shaft, means for operating the second shaft, a coupling between the said shafts, a pivoted and spring pressed lever, connected with the coupling, a locking member for said lever, and means for operating the locking member from the table to release said lever.

In testimony whereof I have signed my name to this specification in the presence of two subscribing witnesses.

CARL WINKLER.

Witnesses:
O. MEERBACHE,
H. J. SHEHLIN.

Copies of this patent may be obtained for five cents each, by addressing the "Commissioner of Patents, Washington, D. C."